(12) United States Patent
Gleason

(10) Patent No.: US 6,516,487 B1
(45) Date of Patent: Feb. 11, 2003

(54) DOCKLEVELER WITH A BARRIER

(75) Inventor: Denis Patrick Gleason, Bowmanville (CA)

(73) Assignee: Kelley Atlantic Ltd., Ontario (CA)

( * ) Notice: Subject to any disclaimer, the term of this patent is extended or adjusted under 35 U.S.C. 154(b) by 0 days.

(21) Appl. No.: 09/439,321

(22) Filed: Nov. 12, 1999

(51) Int. Cl.$^7$ ............................................. E01D 1/00
(52) U.S. Cl. ........................................ 14/69.5; 14/71.7
(58) Field of Search ........................ 14/695, 71.1, 71.3, 14/71.7

(56) References Cited

U.S. PATENT DOCUMENTS

| | | |
|---|---|---|
| 2,639,450 A | 5/1953 | Ramer |
| 2,689,965 A | 9/1954 | Fenton |
| 2,993,219 A | 7/1961 | Pennington |
| 3,280,414 A | 10/1966 | Layne |
| 3,424,323 A | 1/1969 | Barnaby |
| 3,486,181 A | 12/1969 | Hecker, Jr. et al. |
| 3,533,118 A | 10/1970 | Rosengen |
| 3,806,976 A | 4/1974 | Yoon |
| 3,872,948 A | 3/1975 | Richards |
| 4,155,468 A | 5/1979 | Royce |
| 4,304,518 A | 12/1981 | Carder et al. |
| 4,325,155 A | 4/1982 | Alten |
| 4,501,042 A | 2/1985 | DiFonzo |
| 4,848,732 A | 7/1989 | Rossato |
| 4,862,547 A * | 9/1989 | Alten .......................... 14/71.1 |
| 4,865,507 A | 9/1989 | Trickle |
| 4,920,598 A | 5/1990 | Hahn |
| 5,040,258 A | 8/1991 | Hahn et al. |
| 5,068,938 A * | 12/1991 | Roscoe ........................ 17/71.7 |
| 5,157,801 A | 10/1992 | Alexander |
| 5,311,628 A | 5/1994 | Springer et al. |
| 5,333,339 A | 8/1994 | Larsen |
| 5,343,583 A | 9/1994 | Cook |
| 5,452,489 A | 9/1995 | Gelder et al. |
| 5,457,838 A | 10/1995 | Gelder et al. |
| 5,553,343 A | 9/1996 | Alexander |
| 5,636,399 A * | 6/1997 | Tremblay et al. ............. 14/71.1 |
| 5,784,740 A * | 7/1998 | DiSento et al. ............... 14/71.3 |
| 6,081,954 A | 7/2000 | Palmersheim et al. |

FOREIGN PATENT DOCUMENTS

| | | |
|---|---|---|
| CA | 935606 | 10/1973 |
| DE | 26 34 652 A1 | 2/1976 |
| DE | 28 52 888 A1 | 7/1978 |
| FR | 2 296 583 | 7/1976 |

* cited by examiner

Primary Examiner—Thomas B. Will
Assistant Examiner—Raymond W Addie
(74) Attorney, Agent, or Firm—Baker & Hostetler LLP

(57) ABSTRACT

A dockleveler having a lip that can be both moved between a pendent inoperative position and an operative position and moved from a retracted to an extended position. This feature allows the lip to be partially extended during an end load so that the lip engages a portion of the vehicle bed and does not contact the load. The dockleveler further includes a barrier that is resiliently mounted to provide a cushioning effect when impacted by material handling equipment. This feature reduces the likelihood of damage to the barrier and/or dockleveler, and further reduces the chance of disrupting a load carried by the material handling equipment.

12 Claims, 7 Drawing Sheets

DOCKLEVELER WITH A BARRIER

FIELD OF THE INVENTION

This invention generally relates to the field of docklevelers that provide a bridge between a loading dock and a vehicle (e.g., a truck or a trailer) positioned at the loading dock.

BACKGROUND OF THE INVENTION

Docklevelers typically include a deck for bridging the space between a loading dock and a vehicle. The deck commonly is pivotally attached to the loading dock and is movable between a declined lowered position, a horizontal stored position, and an inclined raised position. A lip is usually mounted to the outer end of the deck and is disposed in an pendent inoperative position when the deck is in the stored position. In this stored position, the deck is supported by the pendent lip, which is engaged with a lip support. In operation, the deck is lifted to the raised position, then subsequently lowered while moving the lip from the pendent position to an extended operative position. The deck continues to lower until the lip engages the vehicle, and the lip provides support for the outer end of the deck.

In certain loading situations, the lip cannot be moved to the operative position due the positioning of a load on a vehicle. For example, the load may be positioned too close to the end of the vehicle, thereby not providing sufficient space for full extension of the lip. This situation is commonly called an "end load." In order to remove an end load, the dockleveler must be positioned in either the horizontal stored position or the lowered position with the lip in the pendent inoperative position. A fork lift can then be positioned on the deck and used to lift the end load from the vehicle. After the end load is removed, the dockleveler can be raised an then lowered to rest the lip on the vehicle.

Some loading docks include a barrier that inhibits material handling equipment (e.g., fork lifts) from accidentally falling off the end of the deck when the deck is in the stored position. One type of barrier is a lip barrier that is incorporated into the lip of the dockleveler, as disclosed in German Patent Nos. DE2634652 and DE2852888. When the lip is in the extended operative position, the lip barrier is designed to be in a non-blocking position that is below or flush with an upper surface of the deck. When the lip moves to the pendent inoperative position, the lip barrier raises to a blocking position that is above the upper surface of the deck, thereby inhibiting material handling equipment from rolling off the outer end of the deck.

SUMMARY OF THE INVENTION

Lip barriers are simple, reliable barriers that are raised to the blocking position when the lip is pendent. One problem with this design is that it can prevent unloading an end load. That is, with the lip pendent, the raised lip barrier can impede the ability of a fork lift to access the end load. Another problem with the basic lip barrier design is that it is very rigid and can be easily damaged by even a slight impact of a fork lift. Any bending of or damage to the barrier will require repair of the dockleveler. The rigid barrier can also disrupt a load carried by the fork lift.

The dockleveler described herein has several distinct features that provide important advantages over the basic lip barrier design. One such feature is the provision of a lip that can be both moved between a pendent inoperative position and an operative position and moved from a retracted to an extended position. This feature allows the lip to be partially extended during an end load so that the lip engages a portion of the vehicle bed and does not contact the load.

Another distinct feature is the provision of a barrier that is resiliently mounted to provide a cushioning effect when impacted by material handling equipment. This feature reduces the likelihood of damage to the barrier and/or dockleveler, and further reduces the chance of disrupting a load carried by the material handling equipment.

DETAILED DESCRIPTION

The drawings illustrate a loading dock 10 and a dockleveler mounted at the loading dock 10. The dockleveler includes a support structure 12 mounted within a pit 14, and a deck 16 pivotally connected to the support structure 12. A deck actuator in the form of a hydraulic deck cylinder 18 is interconnected between the support structure 12 and the deck 16 to facilitate pivoting the deck 16 relative to the support structure 12.

Figure 6:
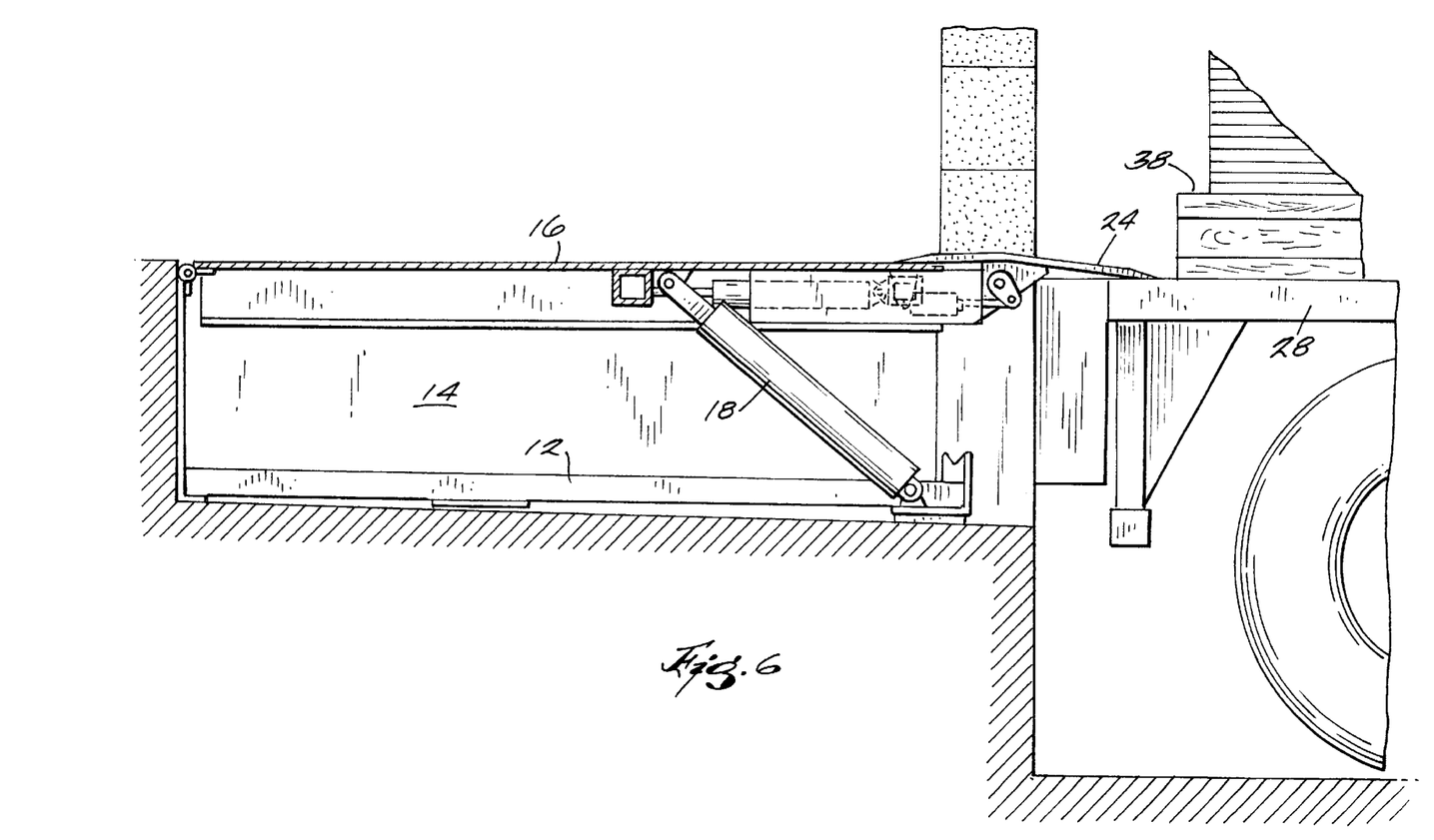
FIG. 6 is the section view of FIG. 2 with the lip in an operative and partially-extended position and engaged with a vehicle having an end load.

An extension member 20 is slidably connected to the deck 16, and an extension actuator in the form of a hydraulic extension cylinder 22 is connected between the deck 16 and the extension member 20 to facilitate movement of the extension member 20 relative to the deck 16. The extension member 20 can be moved between a retracted position (FIG. 3) and an extended position (FIG. 4), or to a partially extended position between the retracted position and the extended position (FIG. 6).

Figure 3:
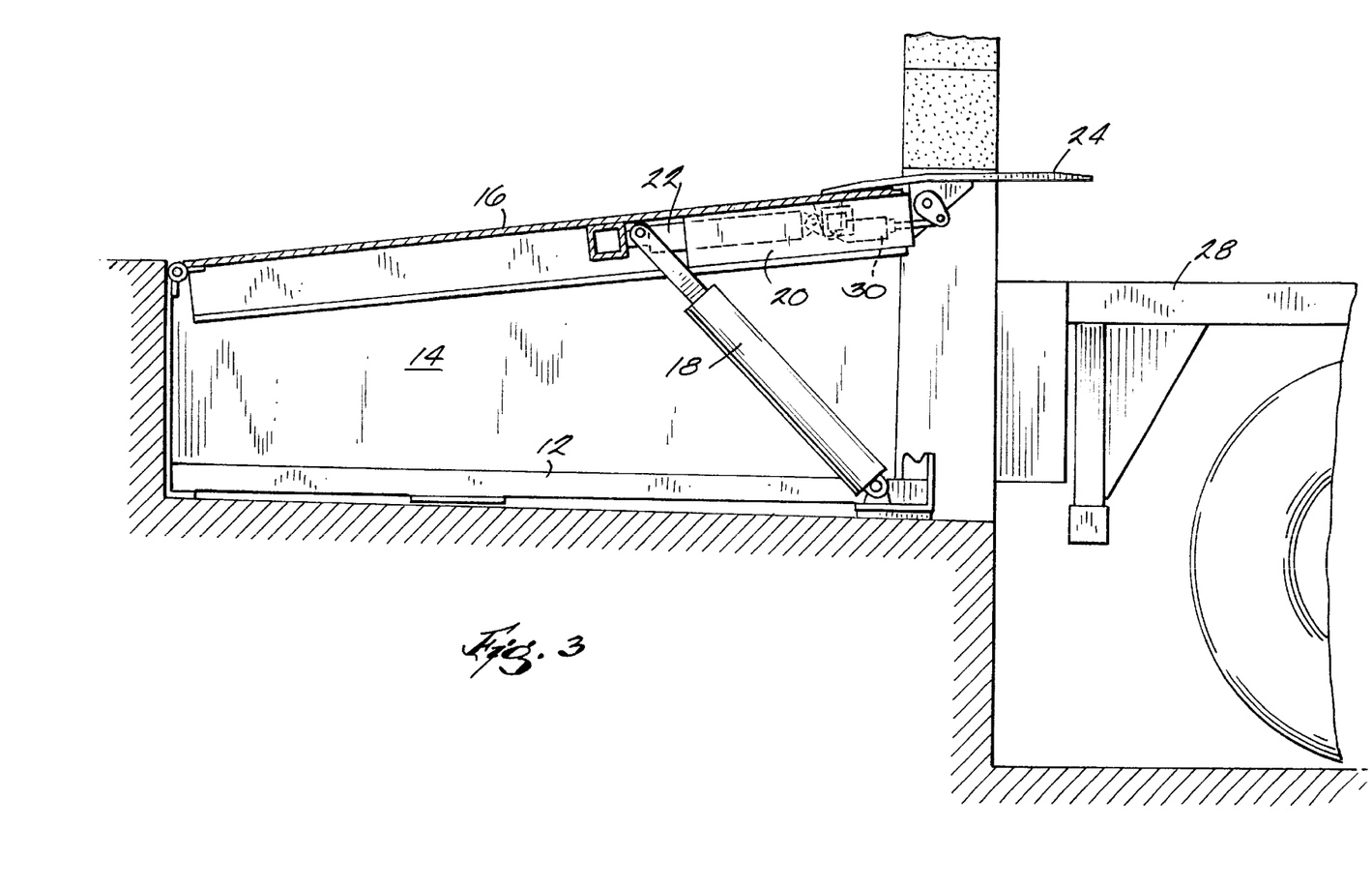
FIG. 3 is the section view of FIG. 2 with the deck raised and the lip in an operative and retracted position.
Figures 4, 5:
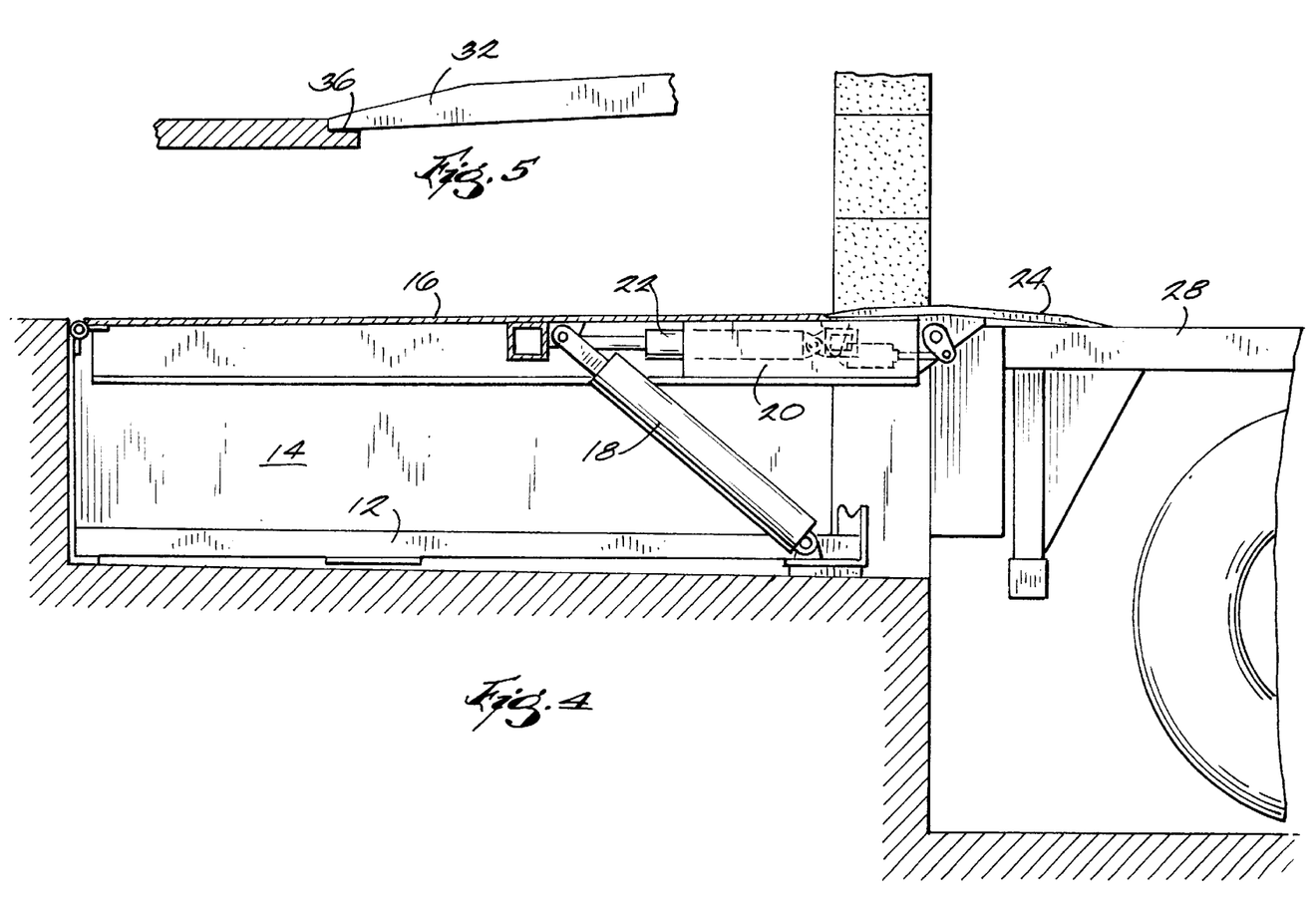
FIG. 4 is the section view of FIG. 2 with the lip in an operative and extended position and engaged with a vehicle.
FIG. 5 is an enlarged view of the back end of the barrier in a non-blocking position.

A lip member 24 is pivotally mounted to the extension member 20. The lip member 24 can be moved between a pendent inoperative position (FIG. 2) and an operative position (FIGS. 3, 4 and 6). When in the inoperative position, the lip member 24 can be engaged with a lip support 26, which provides support to the deck 16 and holds the deck 16 in a substantially horizontal position. When in the operative position, the lip will be positioned to engage the bed of a vehicle 28 parked at the loading dock 10. Movement of the lip member 24 from the inoperative position to the operative position is provided by a lip actuator interconnected between the extension member 20 and the lip member 24. In the illustrated embodiment, the lip actuator comprises a hydraulic lip cylinder 30.

Figure 7:
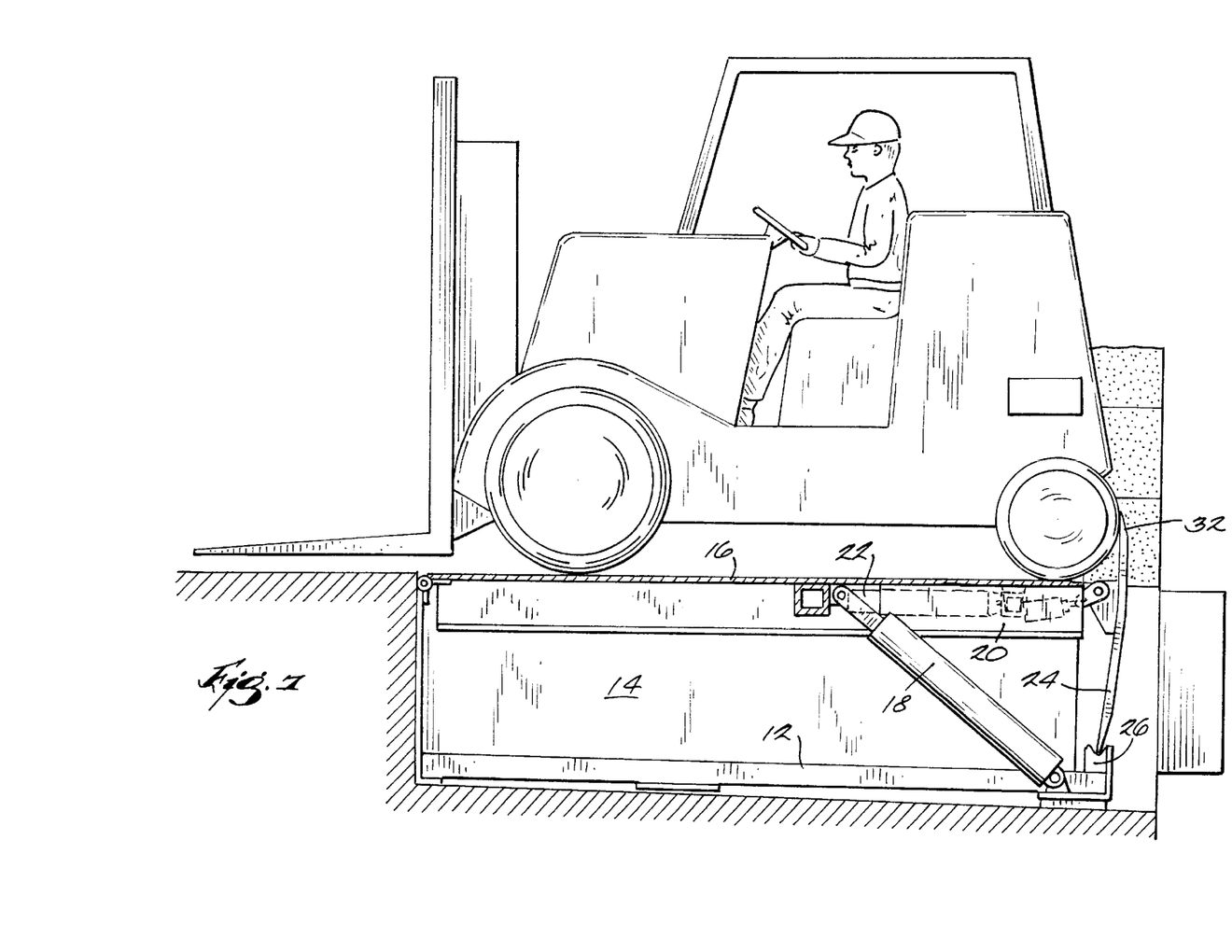
FIG. 7 is the section view of FIG. 2 illustrating a fork lift impacting the barrier.

A barrier member 32 is mounted for a movement relative to the deck 16 between a blocking position (FIGS. 2 and 7), where the barrier member 32 extends above an upper surface 34 of the deck 16, and a non-blocking position (FIGS. 3–16). In the illustrated embodiment, the barrier member 32 is integrally formed with the lip member 24. Movement of the illustrated lip member 24 from the inoperative position to the operative position results in movement of the barrier member 32 from the blocking position to the non-blocking position.

Figure 1:
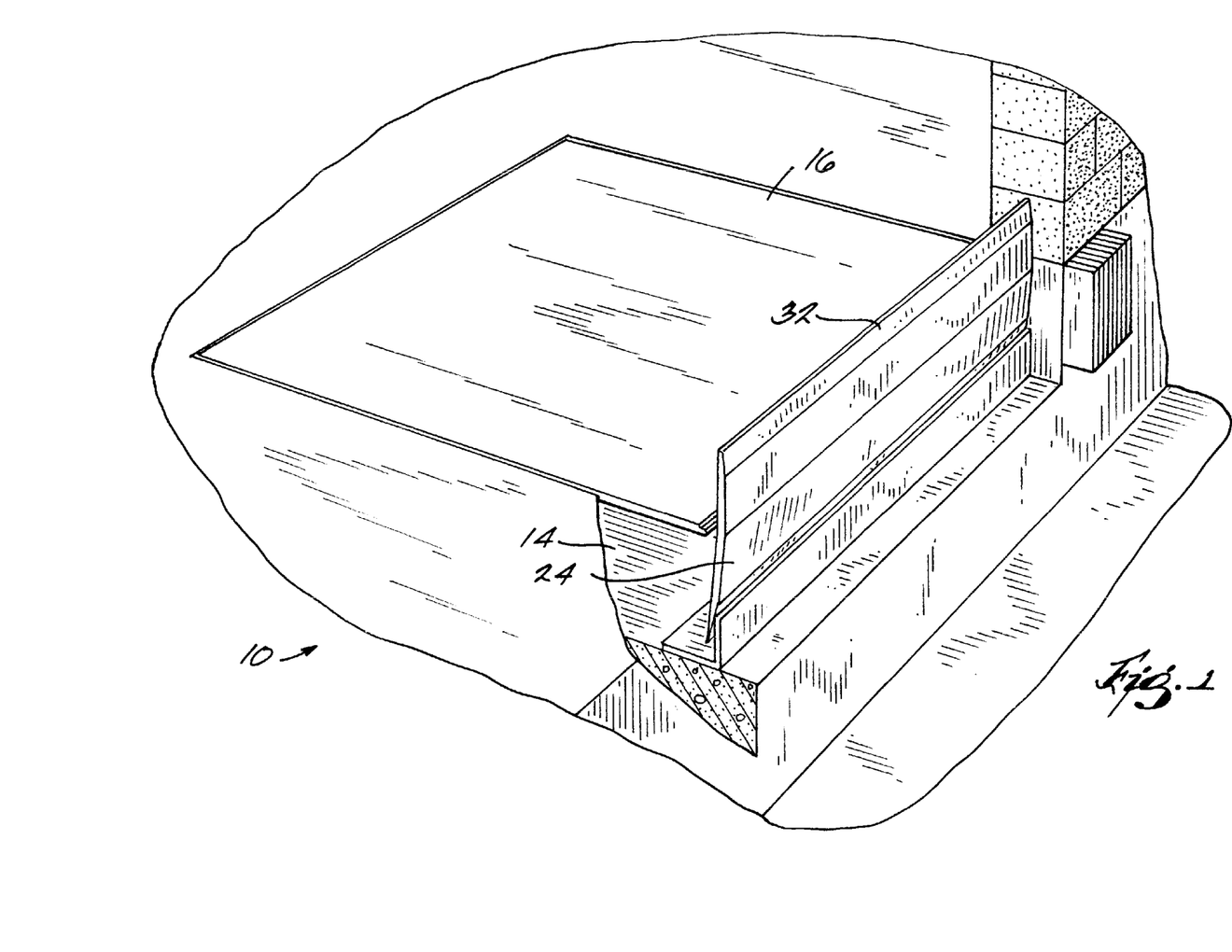
FIG. 1 is a perspective view of a loading dock and dockleveler embodying the present invention.
Figure 2:
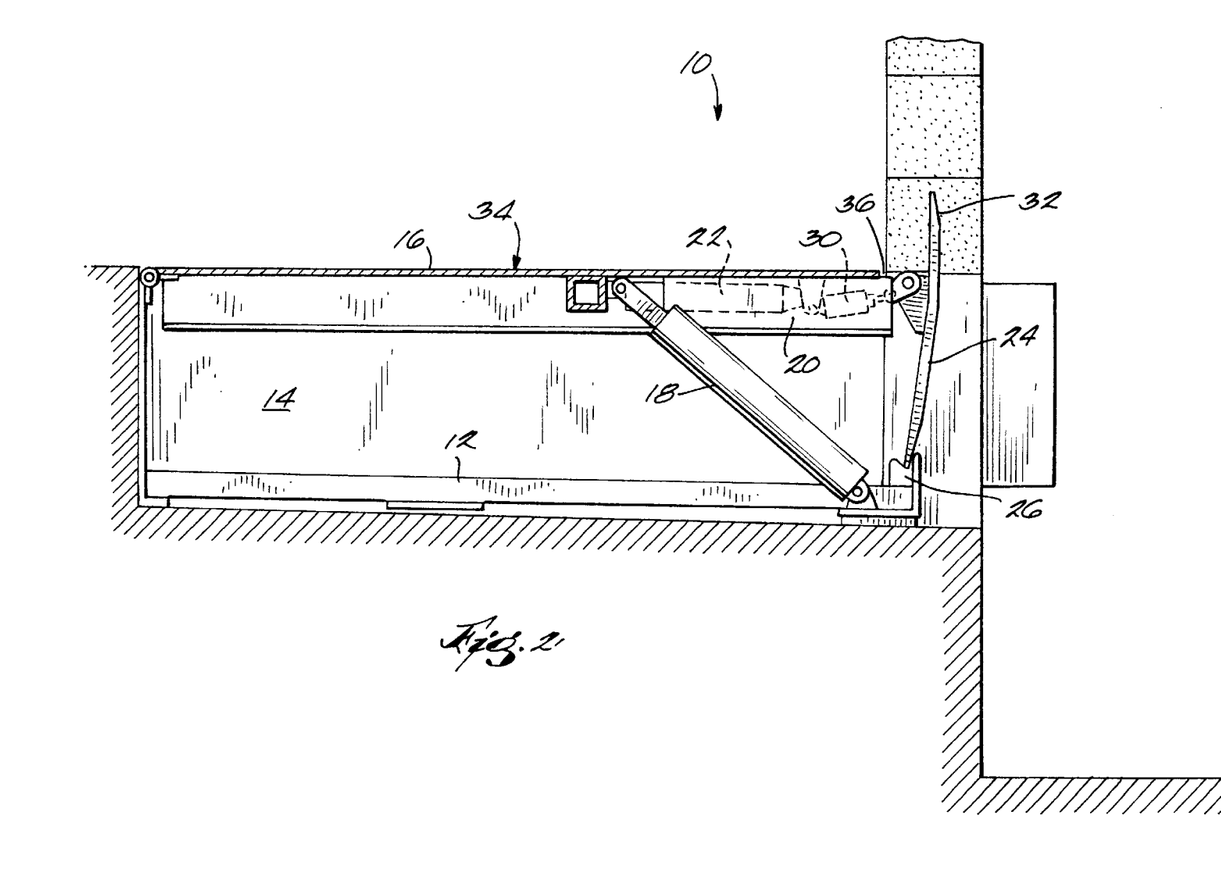
FIG. 2 is a side section view of the dockleveler of FIG. 1 in a stored position.

The standard operation of the dockleveler starts with the dockleveler in the stored position (FIG. 2). After a vehicle 28 is properly positioned against at the loading dock 10, the deck actuator can be activated to lift the deck 16 to a raised position, and the lip actuator can be activated to move the lip member 24 to the operative position (FIG. 3). The extension actuator is then activated to extend the lip from the retracted position to the extended position, and the deck 16 is then lowered until the lip engages the vehicle 28 (FIG. 4). With the lip in the operative position and fully extended, the tip of the barrier (in the non-blocking position) will fall into a recess 36 in the upper surface 34 of the deck 16 to provide a smooth transition from the deck 16 onto the lip member 24 (FIG. 5). After the loading operation is complete, the deck 16 can be raised, and the lip can be moved to the inoperative position and then to the retracted position. Subsequent lowering of the deck 16 will result in the lip engaging the lip support 26 to put the dockleveler back in the stored position (FIG. 2).

When the illustrated dockleveler is used to service a vehicle 28 having an end load 38, the operator of the dockleveler can control the extension of the lip so that the lip never reaches its fully extended position (FIG. 6). By controlling the extension of the lip, the lip can be extended to a point where it will engage the vehicle 28, but will not contact the load on the vehicle 28.

With the dockleveler in the stored position (FIGS. 2 and 7), it can be appreciated that the barrier member 32 will provide some resilience if impacted by a material handling vehicle 28. More specifically, if the barrier member 32 is contacted, the extension actuator will allow the extension member 20 (and the barrier member 32 connected to the extension member 20) to move outwardly away from the loading dock 10 by virtue of an impact relief valve, described below in more detail.

Figure 8:
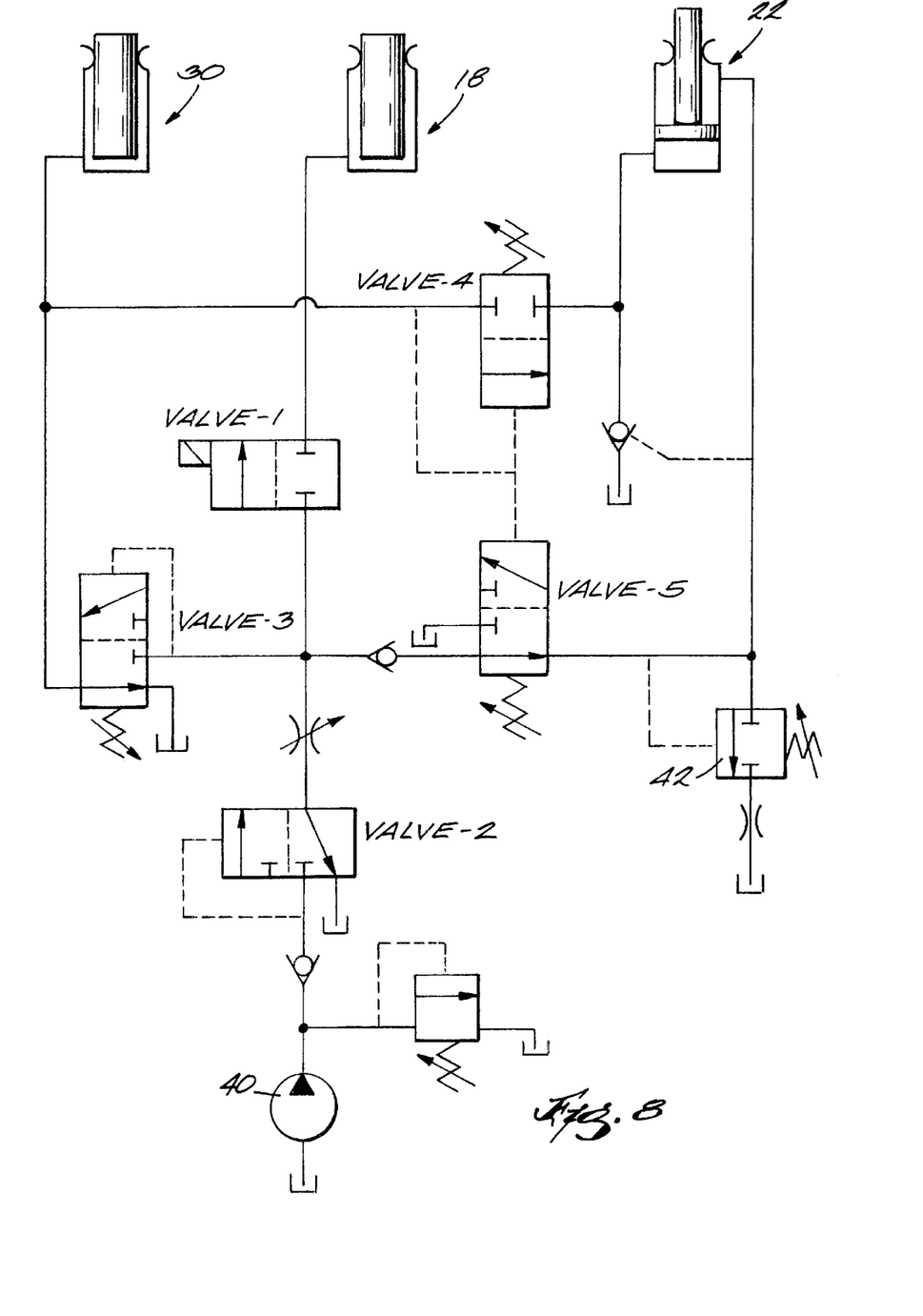
FIG. 8 is a schematic of the hydraulic circuit for the illustrated embodiment.

Referring to FIG. 8, the hydraulic circuit of the illustrated embodiment includes a pump 40, five valves (labelled valve-1, valve-2, etc.), the deck cylinder 18, the lip cylinder 30, and the extension cylinder 22 that is a double-acting cylinder. The system further includes a "raise" button (not shown) that activates the pump 40, and an "extend" button (not shown) that activates the pump 40 and de-energizes valve-1.

When the system is provided with power, valve-1 is energized and moved to the open position. Pushing the raise button activates the pump 40, which creates pressure in the fluid line and cause valve-2 to open. Fluid is thereby allowed to enter both the back side of the extension cylinder 22, to hold the extension member 20 retracted, and the deck cylinder 18, to raise the deck. When the deck cylinder 18 reaches its limit, the increased pressure causes valve-3 to open, thereby allowing pressurized fluid to reach the lip cylinder 30. Once the lip cylinder 30 reaches its limit, the increased pressure causes valve-4 to open and valve-5 to shift, thereby allowing pressurized fluid to reach the front side of the extension cylinder 22 and return oil from the backside to pass the reservoir. Once the extension cylinder 22 reaches its limit, the pump 40 is turned off by releasing the raise button, and the deck 16 lowers until the lip contacts the vehicle 28 bed. The pilot pressure from the deck cylinder 18 maintains valve-3 in its open position until the dockleveler comes to rest on the vehicle 28, at which time the line pressure falls and pressure-actuated valves return to the resting positions.

After the loading operation is completed, the deck 16 can be returned to the stored position by pushing the raise button to lift the deck. The lip will fall since valve-3 has returned to the closed position, and the lip will also be retracted since valve-4 and valve-5 have returned to their resting positions. Once the lip has cleared the vehicle 28 bed, but before the deck reaches its full height, the raise button is released, resulting in the deck slowly descending until the lip engages the lip support 26.

In order to perform an end load, the same sequence of events is performed, except the raise button is released before the extension cylinder 22 reaches its fully-extended position. This will cause the deck to start descending with a partially-extended lip. If the lip needs to be extended further, the extend button can be pushed, which causes valve-1 to close (thereby stopping the descent of the deck) and starts the pump 40. This causes the extension cylinder 22 to further extend. Upon release of the extend button, the pump 40 will stop and the deck will continue to fall. This sequence can be repeated until the lip is extended to the desired position.

The hydraulic circuit further includes a pressure relief valve 42 that will relive excessive pressure in the extension cylinder. More specifically, when the dockleveler is stored (FIG. 2), the barrier member 32 will absorb an impact (FIG. 7) by expelling fluid through the pressure relief valve 42.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of using a dockleveler for bridging the space between a loading dock and a vehicle, the dockleveler including a deck movable between a raised position and a lowered position, and a lip member connected to the deck and movable relative to the deck between a pendent inoperative position and an operative position and further between a retracted position and an extended position, said method comprising the steps of:

positioning the vehicle at the loading dock;

raising the deck toward the raised position;

moving the lip member from the pendent inoperative position to the operative position;

extending the lip member toward the extended position;

stopping the lip member at an intermediate position between the retracted position and the extended position;

lowering the deck with the lip in the intermediate position toward the lowered position; and contacting the lip member with the vehicle.

2. The method of claim 1, further comprising a barrier member secured to the deck and movable between a blocked position and an unblocked position, and wherein said method further comprises the step of moving the barrier member from the blocked position to the unblocked position.

3. The method of claim 1, wherein said moving steps includes the step of pivoting the lip member.

4. The method of claim 1, wherein the dockleveler further comprises a lip support positioned below the lip member and dimensioned to engage and support the lip member in the inoperative position, and wherein said raising step includes disengaging the lip member from the lip support.

5. The method of claim 1, wherein the dockleveler further includes an extension member movably mounted to the deck and pivotally supporting the lip member, and wherein said extending step includes moving the extension member relative to the deck.

6. The method of claim 1, wherein said extending step occurs after said moving step.

7. A dockleveler comprising:
   a deck having an upper surface movable between a raised position and a lowered position;
   a barrier member movable relative to said deck between a blocking position, where said barrier member extends above said upper surface, and a non-blocking position, said barrier member being resiliently mounted when in the blocking position to thereby cushion the impact of a material handling vehicle.

8. A dockleveler as claimed in claim 7, further comprising a lip member connected to said deck and movable relative to said deck between an inoperative position and an operative position, said barrier member being secured to said lip member.

9. A dockleveler as claimed in claim 8, wherein said barrier member is formed integrally with said lip member.

10. A dockleveler as claimed in claim 7, further comprising a damping device connecting said barrier member to said deck.

11. A dockleveler as claimed in claim 10, wherein said damping device includes:
    a cylinder;
    a piston movably positioned within said cylinder; and
    a working fluid positioned within said cylinder.

12. A dockleveler as claimed in claim 10, further comprising an extension member movably mounted to said deck and supporting said barrier member, said damping device being connected between said deck and said extension member.

* * * * *